(12) United States Patent
Dai et al.

(10) Patent No.: US 11,959,888 B2
(45) Date of Patent: Apr. 16, 2024

(54) DEVICE AND METHOD FOR TESTING OVERALL ANCHORAGE PERFORMANCE OF BASALT FIBER REINFORCED PLASTIC (BFRP) ANCHOR CABLE

(71) Applicant: Wuhan Center, China Geological Survey (Central South China Innovation Center for Geosciences), Wuhan (CN)

(72) Inventors: Zhenwei Dai, Wuhan (CN); Yanjun Zhang, Wuhan (CN); Xiaolin Fu, Wuhan (CN); Runqing Ye, Wuhan (CN); Jinjun Guo, Wuhan (CN); Zhigang Du, Wuhan (CN)

(73) Assignee: Wuhan Center, China Geological Survey (Central South China Innovation Center for Geosciences), Wuhan (CN)

( * ) Notice: Subject to any disclaimer, the term of this patent is extended or adjusted under 35 U.S.C. 154(b) by 395 days.

(21) Appl. No.: 17/542,489

(22) Filed: Dec. 5, 2021

(65) Prior Publication Data
US 2022/0404248 A1    Dec. 22, 2022

(30) Foreign Application Priority Data
Jun. 16, 2021 (CN) .......................... 202110666853.9

(51) Int. Cl.
*G01N 3/08* (2006.01)
*E02D 5/76* (2006.01)
(Continued)

(52) U.S. Cl.
CPC ................. *G01N 3/08* (2013.01); *E02D 5/76* (2013.01); *G01L 11/025* (2013.01); *G01M 11/085* (2013.01); *G01N 2203/028* (2013.01)

(58) Field of Classification Search
CPC .......... E02D 5/76; E21D 21/02; G01L 1/242; G01L 11/025; G01M 5/0091;
(Continued)

(56) References Cited

U.S. PATENT DOCUMENTS

| | | | |
|---|---|---|---|
| 5,038,622 A | * | 8/1991 | Tijmann .................. G01B 7/16 73/DIG. 1 |
| 7,255,916 B2 | | 8/2007 | Vichniakov et al. |

(Continued)

FOREIGN PATENT DOCUMENTS

| | | | | |
|---|---|---|---|---|
| CN | 204530800 U | * | 8/2015 | |
| CN | 107941617 A | * | 4/2018 | ............... G01N 3/10 |

(Continued)

*Primary Examiner* — Jonathan M Dunlap
(74) *Attorney, Agent, or Firm* — True Shepherd LLC; Andrew C. Cheng

(57) ABSTRACT

A device for testing overall anchorage performance of a basalt fiber reinforced plastic (BFRP) anchor cable includes an anchor cable anchoring system and a data acquisition system. The anchor cable anchoring system includes a test bed, BFRP arranged over the test bed, and a distributed optical fiber bonded to a surface of the BFRP, the test bed being provided with an anchoring section at one end and an outer anchoring section at the other end, the anchoring section anchors one end of the BFRP, and the outer anchoring section anchors the other end of the BFRP. The data acquisition system includes a modem and a grating connected to two ends of the distributed optical fiber in series, and a center hole jack and a dynamometer arranged between the outer anchoring section and an end of the test bed, and the BFRP penetrates the center hole jack and the dynamometer.

10 Claims, 3 Drawing Sheets

(51) Int. Cl.
*G01L 11/02* (2006.01)
*G01M 11/08* (2006.01)

(58) Field of Classification Search
CPC .... G01M 11/083; G01M 11/085; G01N 3/02; G01N 3/04; G01N 3/068; G01N 3/08; G01N 3/10; G01N 3/12; G01N 3/24; G01N 3/28; G01N 2203/0003; G01N 2203/0017; G01N 2203/0019; G01N 2203/0025; G01N 2203/0048; G01N 2203/0071; G01N 2203/0252; G01N 2203/028; G01N 2203/0411; G01N 2203/0641; G01N 2203/0676; G01N 2203/0682; Y02A 10/23
See application file for complete search history.

(56) References Cited

U.S. PATENT DOCUMENTS

| | | | |
|---|---|---|---|
| 9,874,015 B2 | 1/2018 | Smith | |
| 10,408,644 B2 * | 9/2019 | Miyashita | ............. G01B 11/16 |
| 10,934,401 B2 | 3/2021 | Oh et al. | |

FOREIGN PATENT DOCUMENTS

| | | | | |
|---|---|---|---|---|
| CN | 210071552 U | * | 2/2020 | ............... G01N 3/18 |
| CN | 111707562 A | * | 9/2020 | ........... G01L 1/2206 |
| CN | 111855416 A | * | 10/2020 | |
| CN | 113047881 A | * | 6/2021 | ............. E21D 21/00 |
| CN | 109297810 B | * | 11/2021 | ............. G01B 11/16 |

\* cited by examiner

DEVICE AND METHOD FOR TESTING OVERALL ANCHORAGE PERFORMANCE OF BASALT FIBER REINFORCED PLASTIC (BFRP) ANCHOR CABLE

CROSS-REFERENCE TO RELATED APPLICATIONS

This application claims priority to Chinese Patent Application No. 202110666853.9 with a filing date of Jun. 16, 2021. The content of the aforementioned application, including any intervening amendments thereto, is incorporated herein by reference.

TECHNICAL FIELD

The present disclosure relates to the technical field of anchor cables, and particularly relates to a device and method for testing overall anchorage performance of a basalt fiber reinforced plastic (BFRP) anchor cable.

BACKGROUND

With the continuous development of material science, a large number of novel fiber reinforced composite material anchor rods (cables) have been developed to replace traditional steel anchor rods (cables). The basalt fiber reinforced plastic (BFRP) has the tensile strength over 1100 MPa, which is four times that of common threaded steel, and has the density which is ⅓ to ¼ that of common steel bars. Further, the BFRP has the advantages of desirable acid and alkali corrosion resistance, stable performance at high temperature, low raw material cost, etc. Accordingly, the BFRP is a desirable alternative for steel bars in a rock-soil anchoring structure. With high engineering application value, the BFRP has received increasing concern in recent years, and the anchor rod (cable) rib body and the anchoring body are no longer limited to the steel bars and cement mortar.

The engineering and scientific researchers have been making efforts to use the BFRP instead of metal bar anchor cables in actual engineering. How to accurately evaluate the overall anchorage performance (drawing force, prestress loss, anti-shear performance, ductility, etc.) of the BFRP anchor cables is the premise of engineering popularization and use, is also crucial for successful use of the novel BFRP anchor cable. In the present indoor anchorage performance test of the BFRP anchor cable, the surrounding rock stress of an anchoring section and the angle relation between the anchor cable and a shear slip plane are not considered in most cases, and the test condition greatly differs from the actual engineering condition, so the anchorage performance parameters cannot be accurately obtained.

SUMMARY

In view of this, for solving the problem about scientific evaluation of overall anchorage performance of a BFRP anchor cable, the embodiment of the present disclosure provides a device and method for testing overall anchorage performance of the BFRP anchor cable.

The embodiment of the present disclosure provides a device for testing overall anchorage performance of the BFRP anchor cable. The device includes an anchor cable anchoring system and a data acquisition system, the anchor cable anchoring system includes a test bed, BFRP arranged above the test bed, and a distributed optical fiber bonded to a surface of the BFRP, the test bed being provided with an anchoring section at one end and an outer anchoring section at the other end, where the anchoring section anchors one end of the BFRP, and the outer anchoring section anchors the other end of the BFRP; and the data acquisition system includes a modem and a grating which are connected to two ends of the distributed optical fiber in series, and a center hole jack and a dynamometer which are arranged between the outer anchoring section and an end of the test bed, and the BFRP penetrates the center hole jack and the dynamometer.

Further, the anchoring section includes a confining pressure sleeve fixed to an inner side of an end of the test bed, a confining pressure hydraulic pump and a confining pressure hydraulic gauge are arranged outside the confining pressure sleeve, the BFRP penetrates the confining pressure sleeve, the confining pressure sleeve is internally provided with a grouting cavity surrounding the BFRP, a surface of the grouting cavity is made of an elastic material, the grouting cavity injects slurry into a periphery of the BFRP using a grouting port to form a grouting body, a surface of the confining pressure sleeve is provided with a pressure injection port in communication with a pressure injection cavity, the confining pressure hydraulic pump is connected to the pressure injection port to apply confining pressure to the grouting body of the anchoring section, and the confining pressure hydraulic gauge is connected to the confining pressure hydraulic pump to measure the applied confining pressure.

Further, the device further includes a shear sliding system, where the shear sliding system includes two test bed frame side plates arranged on two sides of the test bed respectively, a shear force loading box arranged between the two test bed frame side plates, a shear force distribution housing attached and fixed to the BFRP, and a push-pull component, the two test bed frame side plates are provided with opposite constraint grooves, two ends of the shear force loading box are supported in the two constraint grooves respectively, two clamping ports are provided in two opposite side surfaces of the shear force loading box, two ends of the shear force distribution housing are embedded in the two clamping ports respectively, the push-pull component includes a hydraulic jack, and an output end of the hydraulic jack is connected to the shear force loading box, so as to drive the shear force loading box to move along the constraint groove to apply shear force to the BFRP.

Further, the clamping port is provided with a plurality of upper clamping ports at an upper portion and a plurality of lower clamping ports at a lower portion, the upper clamping ports and the lower clamping ports are arranged in a one-to-one opposite mode one above the other, and the two ends of the shear force distribution housing are embedded between the upper clamping ports and the lower clamping ports of the two clamping ports respectively Further, the push-pull component further includes two parallel rows of guide rods fixed to the hydraulic jack, the hydraulic jack is arranged on one outer side of the test bed frame side plate, two parallel guide grooves are provided in the test bed frame side plate, and the two rows of guide rods are inserted into the two guide grooves respectively.

Further, the device includes an extendable test bed frame, where the extendable test bed frame includes a left drawing extendable support and a right drawing extendable support which are connected using a drawer slide rail, and the two test bed frame side plates are two opposite side surfaces of the left drawing extendable support or the right drawing extendable support.

Further, the extendable test bed frame includes a guide rail, rollers are arranged at bottoms of the left drawing extendable support and the right drawing extendable support, and the rollers are supported on the guide rail.

The technical solution of the device for testing overall anchorage performance of a BFRP anchor cable in the embodiment of the present disclosure has the beneficial effects that the distributed optical fiber and the detected BFRP are bonded into a whole, such that deformation detection of the BFRP is achieved by detecting deformation of the distributed optical fiber, and drawing force of the BFRP and the change of the drawing force are measured using a dynamometer to obtain anchorage performance index parameters of drawing force, prestress loss, shear deformation, ductility, a creep feature, etc. of the BFRP anchor cable, thereby scientifically evaluating the overall anchorage performance of the BFRP anchor cable.

The embodiment of the present disclosure further provides a method for testing overall anchorage performance of a BFRP anchor cable to measure ductility, creep performance and drawing force of the BFRP. The method uses the device for testing overall anchorage performance of a BFRP anchor cable according to the above claims, and includes: applying drawing force to the BFRP using a center hole jack, measuring ductility and creep performance of the BFRP using a modem, and measuring the drawing force on the BFRP using a dynamometer.

The embodiment of the present disclosure further provides a method for testing overall anchorage performance of a BFRP anchor cable to measure ductility, creep performance and drawing force of the BFRP under a confining pressure effect on a grouting body. The method uses the above device for testing overall anchorage performance of a BFRP anchor cable, and includes: applying confining pressure to a grouting body of an anchoring section using a confining pressure hydraulic pump, applying drawing force to the BFRP using a center hole jack, measuring ductility and creep performance of the BFRP using a modem, and measuring the drawing force on the BFRP using a dynamometer.

The embodiment of the present disclosure further provides a method for testing overall anchorage performance of a BFRP anchor cable to measure shear deformation and drawing force of the BFRP in a sheared state. The method uses the above device for testing overall anchorage performance of a BFRP anchor cable, and includes: pushing a shear force loading box by a hydraulic jack to apply shear force to the BFRP, applying drawing force to the BFRP using a center hole jack, measuring shear deformation of the BFRP using a modem, and measuring the drawing force on the BFRP using a dynamometer.

The beneficial effects of the method for testing overall anchorage performance of a BFRP anchor cable are identical to those of the device for testing overall anchorage performance of a BFRP anchor cable, and repeated explanation is not needed here.

In the figures: 1—test bed, 2—BFRP, 3—distributed optical fiber, 4—confining pressure sleeve, 5—extendable test bed frame, 6—grouting body, 7—baffle, 8—grating, 9—modem, 10—center hole jack, 11—outer anchor disc, 12—dynamometer, 13—base plate, 14—jack hydraulic pump, 15—jack hydraulic gauge, 16—confining pressure hydraulic pump, 17—confining pressure hydraulic gauge, 18—hydraulic jack, 19—shear force loading box, 20—guide rail, 21—clamp groove, 22—grouting cavity, 23—grouting port, 24—grouting cavity side wall, 25—pressure injection cavity, 26—pressure injection port, 27—test bed frame side plate, 28—constraint groove, 29—guide rod, 30—guide groove, 31—shear force distribution housing, 32—clamping port, 33—upper clamping port, 34—lower clamping port, 35—left drawing extendable support, 36—right drawing extendable support, 37—drawer slide rail, 38—roller, and 39—bolt.

DETAILED DESCRIPTION OF THE EMBODIMENTS

In order to make the objectives, technical solutions and advantages of the present disclosure clearer, the implementations of the present disclosure are described in more detail below with reference to the accompanying drawings.

Embodiment 1

Figure 1:
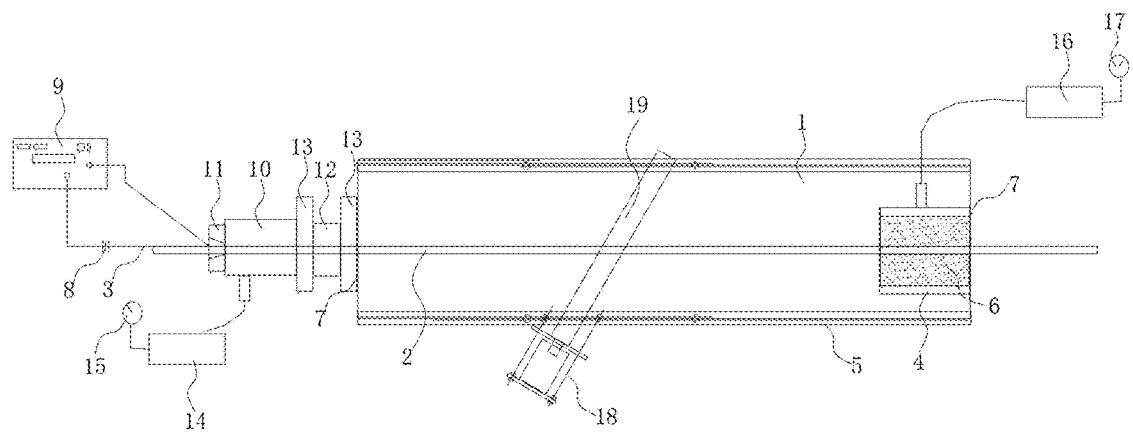
FIG. 1 is a top view of a device for testing overall anchorage performance of a BFRP anchor cable.
Figure 2:
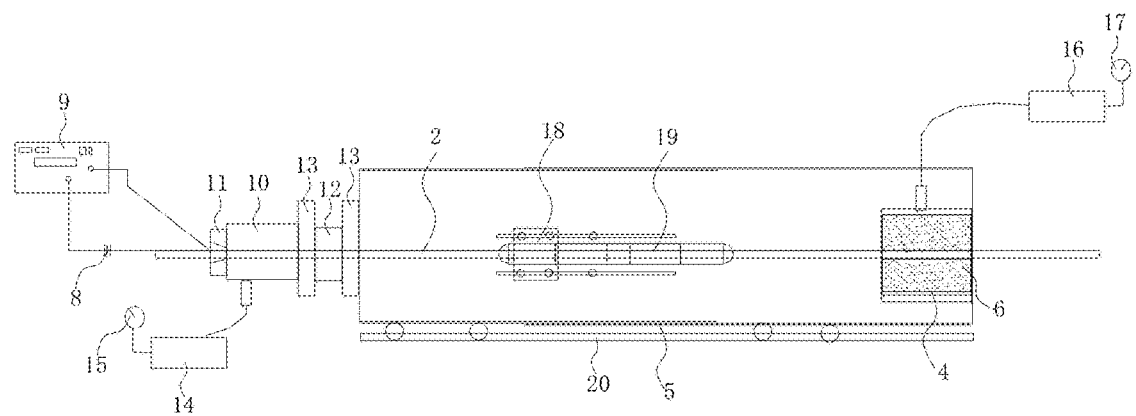
FIG. 2 is a front view of a device for testing overall anchorage performance of a BFRP anchor cable.

With reference to FIGS. 1 and 2, the embodiment of the present disclosure provides a device for testing overall anchorage performance of a BFRP anchor cable. The device includes an anchor cable anchoring system and a data acquisition system.

The anchor cable anchoring system includes a test bed 1, BFRP 2 arranged above the test bed 1, and a distributed optical fiber 3 bonded to a surface of the BFRP 2, the test bed 1 being provided with an anchoring section at one end and an outer anchoring section at the other end, where the anchoring section anchors one end of the BFRP 2, and the outer anchoring section anchors the other end of the BFRP 2.

Specifically, baffles 7 are arranged at two ends of the test bed 1, through holes for the BFRP 2 to penetrate are reserved in the two baffles 7, and two ends of the BFRP 2 bonded to the distributed optical fiber 3 penetrate the baffles 7 at the two ends of the test bed 1 respectively.

The anchoring section is arranged at one end of the test bed 1, specifically, the anchoring section includes a confining pressure sleeve 4 fixed to an inner side of an end of the test bed 1, and a hydraulic pump 16 and a confining pressure hydraulic gauge 17 are further arranged outside the confining pressure sleeve 4.

Two ends of the confining pressure sleeve 4 are closed, and a through hole for the BFRP 2 to penetrate is provided in an axis of the confining pressure sleeve 4. The confining pressure sleeve 4 is located on the inner side of the end of the test bed 1, a plurality of clamp grooves 21 are provided in a surface of the confining pressure sleeve 4, one end of the confining pressure sleeve 4 is clamped into the baffle 7 at the end of the test bed 1 using the clamp groove 21 and fixed by welding, a detachable sealing member is arranged at the other end of the confining pressure sleeve 4 and may be arranged as two semicircular sealing plates, semicircular holes are provided in circle centers of the two sealing plates, the two sealing plates are arranged at an end port of one end, away from the baffle 7, of the confining pressure sleeve 4 and are fixedly bonded to the end port, the two sealing plates are spliced into a complete circular plate, and the two semicircular holes are spliced into a complete circular hole for the BFRP 2 to penetrate. The BFRP 2 penetrates the confining pressure sleeve 4, the confining pressure sleeve 4 is internally provided with a grouting cavity 22 surrounding the BFRP 2, and a grouting cavity side wall 24 is made of elastic materials, for example, rubber and other elastomers.

An annular pressure injection cavity 25 is further reserved between the grouting cavity side wall 24 and an outer wall of the confining pressure sleeve 4, the grouting cavity 22 injects slurry into a periphery of the BFRP 2 using a grouting port 23, a grouting body 6 is formed after the slurry is solidified, in a grouting process, plastic soft mud may be smeared on a contact portion of the BFRP 2 and the baffle 7 and a contact portion of the two sealing plates, so as to enhance a sealing effect. In addition, after the grouting body 6 is formed, the two sealing plates may be detached to prevent the sealing plates from affecting stress movement of the BFRP 2 and the grouting body 6.

A surface of the confining pressure sleeve 4 is provided with a pressure injection port 26 in communication with the pressure injection cavity 25, the pressure injection port 26 is in communication with the pressure injection cavity 25 surrounding the grouting cavity 22, the confining pressure hydraulic pump 16 is connected to the pressure injection port 26, hydraulic oil may be injected into the confining pressure sleeve 4 using the pressure injection port 26, and pressure is applied to the grouting cavity side wall 24 using the hydraulic oil and is transmitted to the grouting body 6, so as to apply confining pressure to the grouting body 6. The confining pressure hydraulic gauge 17 is connected to the confining pressure hydraulic pump 16 to measure the applied confining pressure.

The grouting cavity 22 is grouted to form the grouting body 6 to tightly wrap the BFRP 2, such that the confining pressure of surrounding rock mass of the anchor cable anchoring section is simulated using pressure applying of the confining pressure sleeve. When the BFRP 2 is subjected to drawing force, the confining pressure sleeve 4 simulates surrounding rock, the BFRP 2 may be directly separated from the grouting body 6 and may also drive the grouting body 6 to be separated from the confining pressure sleeve 4, and then performance tests of the BFRP of the grouting body of the anchoring section under different confining pressure limiting conditions may be simulated.

The outer anchoring section is arranged at the other end of the test bed 1 and includes an outer anchor disc 11, the outer anchor disc 11 matches the baffle 7 at the end of the test bed 1 to lock the other end of the BFRP 2, and the BFRP 2 is tensioned and straightened to apply tensioning force.

The data acquisition system includes a modem 9 and a grating 8 which are connected to two ends of the distributed optical fiber 3 in series, and a center hole jack 10 and a dynamometer 12 which are arranged between the outer anchoring section and the baffle 7. The modem 9 and the grating 8 match to measure deformation of the distributed optical fiber 3. The center hole jack 10 and the dynamometer 12 are arranged on a side, located on the outer anchoring section, of the test bed 1, the center hole jack 10 and the dynamometer 12 are sequentially arranged between the outer anchor disc 11 and the baffle 7, and the BFRP 2 penetrates the center hole jack 10 and the dynamometer 12. The center hole jack 10 is configured to apply drawing force to the BFRP 2, and the dynamometer 12 is configured to measure the drawing force applied to the BFRP 2. In addition, base plates 13 may be provided between the center hole jack 10 and the dynamometer 12 and between the dynamometer 12 and the baffle 7 to increase stability of the anchoring system.

In this embodiment, the center hole jack 10 is further provided with a jack hydraulic pump 14 matching same for use and a jack hydraulic gauge 15 connected to the jack hydraulic pump 14, the jack hydraulic pump 14 is configured to inject pressure into the center hole jack 10 to make it to work, and the jack hydraulic gauge 15 collects the pumping pressure of the jack hydraulic pump 14.

The embodiment of the present disclosure further provides a test method for the above device for testing overall anchorage performance of a BFRP anchor cable. The method may measure ductility, creep performance and the drawing force of the BFRP 2, and includes: drawing force is applied to the BFRP 2 using the center hole jack 10, deformation of the BFRP 2 is measured using the modem 9 to determine the ductility and creep performance thereof, and the drawing force on the BFRP 2 is measured using the dynamometer 12.

Specifically, certain drawing force is applied to the BFRP 2 to simulate anchor cable prestress application; the drawing force is applied in a staged progressive increase mode to simulate a staged loading process of anchor cable prestress; when an ultimate load is applied, the BFRP 2 is damaged, and ultimate pulling resistance and ultimate ductility of the anchor cable may be obtained; and when a certain design load is applied, stability is kept, and deformation of different degrees and prestress change values at different positions of the BFRP 2 are measured, so as to obtain a creep feature and a prestress loss change rule of the anchor cable.

Further, the embodiment also provides a method for measuring the ductility, the creep performance and the drawing force of the BFRP under confining pressure action of the grouting body 6 by using the device for testing overall anchoring performance of a BFRP anchor cable. The method specifically includes: different confining pressure is applied to the grouting body 6 using the confining pressure hydraulic pump 16, the deformation of the BFRP 2 is measured using the modem 9 so as to determine the ductility and creep performance of the BFRP 2 under different confining pressure conditions, and the drawing force on the BFRP 2 and a change value of the drawing force are measured using the dynamometer 12.

Embodiment 2

Figure 3:
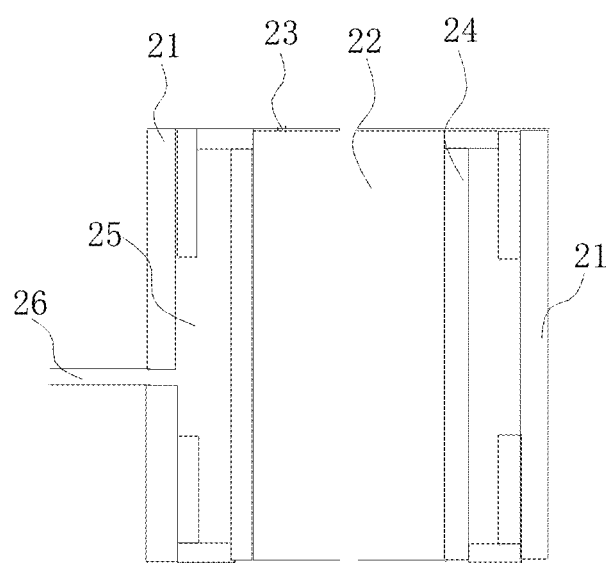
FIG. 3 is a schematic diagram of a confining pressure sleeve 4 of FIG. 1.
Figure 4:
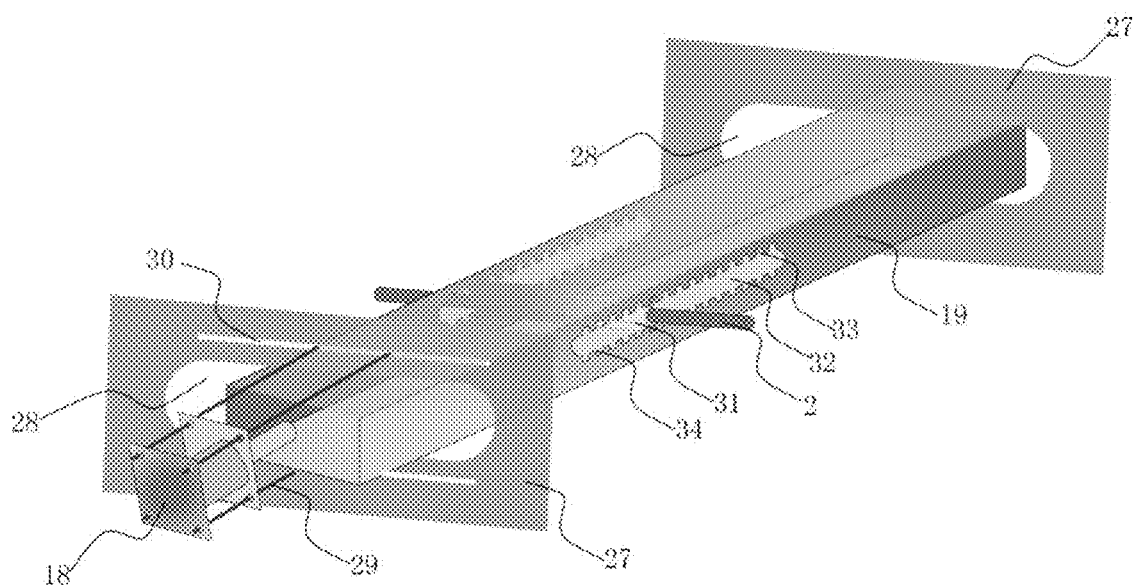
FIG. 4 is a schematic diagram of a shear force loading box 19 of FIG. 1.
Figure 5:
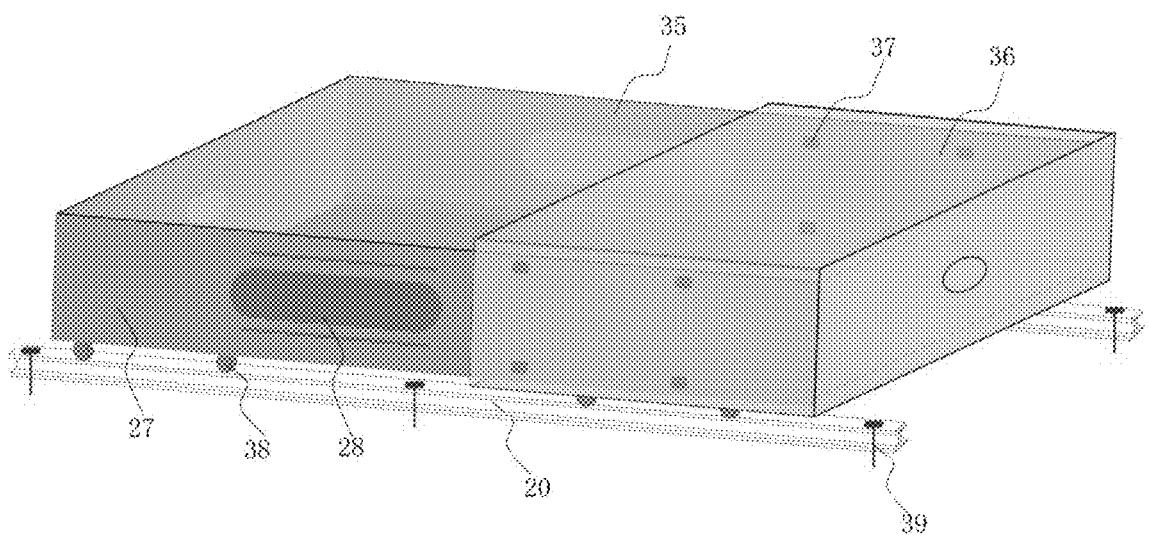
FIG. 5 is a schematic diagram of an extendable test bed frame 5.

On the basis of Embodiment 1, with reference to FIGS. 1, 2 and 3, the device for testing overall anchorage performance of a BFRP anchor cable further includes a shear sliding system, where the shear sliding system is configured to simulate a shear stress condition of the BFRP 2.

Specifically, the shear sliding system includes two test bed frame side plates 27 arranged on two sides of a test bed 1 respectively, a shear force loading box 19 arranged between the two test bed frame side plates 27, a shear force distribution housing 31 attached and fixed to the BFRP 2, and a push-pull component.

The shear force distribution housing 31 is arranged in a length direction of the BFRP 2 and tightly attached to the BFRP 2. The shear force distribution housing 31 may be fixed to a surface of the BFRP 2, and the BFRP 2 may also penetrate the shear force distribution housing 31 to be clamped and fixed.

Lower portions of the two test bed frame side plates 27 are fixed, opposite constraint grooves 28 are provided in the two test bed frame side plates 27, and an area of each constraint groove 28 is greater than a sectional area of the shear force loading box 19, such that two ends of the shear force loading box 19 may penetrate the two constraint grooves 28 respectively and may move. A shape of the constraint groove 28 may be various without limitation, and is provided as a kidney circle, that is, a racetrack shape herein.

Two clamping ports 32 are provided in two opposite side surfaces of the shear force loading box 19, and two ends of the shear force distribution housing 31 are embedded into the two clamping ports 32 respectively. The clamping port 32 is configured to fix the shear force distribution housing 31, preferably, the clamping port 32 is provided with a plurality of upper clamping ports 33 at an upper portion and a plurality of lower clamping ports 34 at a lower portion, the upper clamping ports 33 and the lower clamping ports 34 are arranged in a one-to-one opposite mode one above the other, and the two ends of the shear force distribution housing 31 are embedded between the upper clamping ports 33 and the lower clamping ports 34 of the two clamping ports 32 respectively. The shear force distribution housing 31 is located between different upper clamping port 33 and lower clamping port 34, so as to adjust a direction and an angle of shear force on the BFRP 2.

The push-pull component includes a hydraulic jack 18, the hydraulic jack 18 and the shear force loading box 19 are arranged in an inclined mode, and an output end of the hydraulic jack 18 is connected to the shear force loading box 19 to drive the shear force loading box 19 to move along the constraint groove 28 to apply the shear force to the BFRP 2. The push-pull component further includes two parallel rows of guide rods 29 fixed to the hydraulic jack 18, the hydraulic jack 18 is arranged on one outer side of the test bed frame side plate 27, two parallel guide grooves 30 are provided in the test bed frame side plate 27, the guide grooves 30 are linear grooves, and the two rows of guide rods 29 are inserted into the two guide grooves 30 respectively. The guide rod 29 may only move in the guide groove 30, such that when the hydraulic jack 18 pushes and pulls the shear force loading box 19, smooth shear force is applied to the shear force distribution housing 31.

This embodiment further provides a method for testing overall anchorage performance of a BFRP anchor cable by using the device for testing overall anchorage performance of a BFRP anchor cable. The method is used for measuring the shear deformation and the drawing force of the BFRP 2 in a sheared state, and specifically includes: the hydraulic jack 18 pushes the shear force loading box 19 to apply shear force to the BFRP 2, the shear deformation of the BFRP 2 is measured using the modem 9, and the drawing force on the BFRP 2 is measured using the dynamometer 12.

Embodiment 3

On the basis of Embodiment 2, with reference to FIGS. 1, 2, 3 and 4, two test bed frame side plates 27 may be configured as an extendable test bed frame 5.

Specifically, the extendable test bed frame 5 includes a left drawing extendable support 35 and a right drawing extendable support 36 which are connected using a drawer slide rail 37, and the two test bed frame side plates 27 are two opposite side surfaces of the left drawing extendable support 35 or the right drawing extendable support 36. Here, the drawer slide rail 37 is a drawer slide rail with a self-locking function, and the left drawing extendable support 35 or the right drawing extendable support 36 is pulled to any position and is self-locked and fixed on the drawer slide rail.

The left drawing extendable support 35 and the right drawing extendable support 36 are drawn relative to each other to change a position of the shear force loading box 19 so as to change a length of the entire extendable test bed frame 5 to match a length of the test bed 1, that is, to match a length of the BFRP 2. On the other hand, it is also possible to change positions of the two constraint grooves 28, so as to change a position of the shear force loading box 19. Meanwhile, a position of the shear force distribution housing 31 on the BFRP 2 is adjusted, such that the shear force may be applied to the BFRP 2 everywhere to measure the shear deformation of the BFRP 2 everywhere.

The extendable test bed frame 5 further includes a guide rail 20, the guide rail 20 is fixed to the ground using a bolt 39, rollers 38 are arranged at bottoms of the left drawing extendable support 35 and the right drawing extendable support 36, and the rollers 38 are supported on the guide rail 20. The roller 38 matches the guide rail 20, so as to facilitate relative drawing of the left drawing extendable support 35 and the right drawing extendable support 36.

Herein, the involved terms including front, rear, upper, lower, etc., are defined in terms of the positions of parts and between the parts in the drawings, just for clarity and convenience of expressing the technical solution. It should be understood that the use of such parties should not limit the scope of protection claimed by the application.

The above embodiments and the features of the embodiments herein may be combined with each other without conflict.

The above embodiment is merely a preferred embodiment of the present disclosure but not intended to limit the present disclosure, and any modifications, equivalent replacements, improvements, etc. made within the spirit and principles of the present disclosure should fall within the scope of protection of the present disclosure.

What is claimed is:

1. A device for testing overall anchorage performance of a basalt fiber reinforced plastic (BFRP) anchor cable, comprising an anchor cable anchoring system and a data acquisition system, wherein
   the anchor cable anchoring system comprises a test bed, BFRP arranged above the test bed, and a distributed optical fiber bonded to a surface of the BFRP, the test bed being provided with an anchoring section at one end and an outer anchoring section at the other end, wherein the anchoring section anchors one end of the BFRP, and the outer anchoring section anchors the other end of the BFRP; and
   the data acquisition system comprises a modem and a grating which are respectively connected to two ends of the distributed optical fiber in series, and a center hole jack and a dynamometer which are arranged between the outer anchoring section and an end of the test bed, and the BFRP penetrates the center hole jack and the dynamometer.

2. The device according to claim 1, wherein the anchoring section comprises a confining pressure sleeve fixed to an inner side of an end of the test bed, a confining pressure hydraulic pump and a confining pressure hydraulic gauge are arranged outside the confining pressure sleeve, the BFRP penetrates the confining pressure sleeve, the confining pressure sleeve is internally provided with a grouting cavity surrounding the BFRP, a surface of the grouting cavity is made of an elastic material, the grouting cavity injects slurry into a periphery of the BFRP through a grouting port to form a grouting body, a surface of the confining pressure sleeve is provided with a pressure injection port in communication with a pressure injection cavity, the confining pressure hydraulic pump is connected to the pressure injection port to apply confining pressure to the grouting body, and the confining pressure hydraulic gauge is connected to the confining pressure hydraulic pump to measure the applied confining pressure.

3. The device according to claim 2, further comprising a shear sliding system, wherein the shear sliding system comprises two test bed frame side plates arranged on two sides of the test bed respectively, a shear force loading box arranged between the two test bed frame side plates, a shear force distribution housing attached and fixed to the BFRP, and a push-pull component, the two test bed frame side plates are provided with opposite constraint grooves, two ends of the shear force loading box are supported in the two constraint grooves respectively, two clamping ports are provided in two opposite side surfaces of the shear force loading box, two ends of the shear force distribution housing are embedded in the two clamping ports respectively, the push-pull component comprises a hydraulic jack, and an output end of the hydraulic jack is connected to the shear force loading box, so as to drive the shear force loading box to move along the constraint groove to apply shear force to the BFRP.

4. The device according to claim 3, wherein the clamping port is provided with a plurality of upper clamping ports at an upper portion and a plurality of lower clamping ports at a lower portion, the upper clamping ports and the lower clamping ports are arranged in a one-to-one opposite mode one above the other, and the two ends of the shear force distribution housing are embedded between the upper clamping ports and the lower clamping ports of the two clamping ports respectively.

5. The device according to claim 4, wherein the push-pull component further comprises two parallel rows of guide rods fixed to the hydraulic jack, the hydraulic jack is arranged on one outer side of the test bed frame side plate, two parallel guide grooves are provided in the test bed frame side plate, and the two rows of guide rods are inserted into the two guide grooves respectively.

6. The device according to claim 3, comprising an extendable test bed frame, wherein the extendable test bed frame comprises a left drawing extendable support and a right drawing extendable support which are connected through a drawer slide rail, and the two test bed frame side plates are two opposite side surfaces of the left drawing extendable support or the right drawing extendable support.

7. The device according to claim 6, wherein the extendable test bed frame comprises a guide rail, rollers are arranged at bottoms of the left drawing extendable support and the right drawing extendable support, and the rollers are supported on the guide rail.

8. A method for testing overall anchorage performance of a BFRP anchor cable, using the device according to claim 1, and comprising: applying drawing force to the BFRP using a center hole jack, measuring ductility and creep performance of the BFRP using a modem, and measuring the drawing force on the BFRP using a dynamometer.

9. The method according to claim 8, further comprising applying drawing force to the BFRP using a center hole jack before measuring ductility and creep performance of the BFRP.

10. A method for testing overall anchorage performance of a BFRP anchor cable, using the device according to claim 1, and comprising: pushing a shear force loading box by a hydraulic jack to apply shear force to the BFRP, applying drawing force to the BFRP using a center hole jack, measuring shear deformation of the BFRP using a modem, and measuring the drawing force on the BFRP using a dynamometer.

* * * * *